No. 700,685. Patented May 20, 1902.
H. HAVILL.
WEEDING IMPLEMENT.
(Application filed Aug. 14, 1901.)
(No Model.)
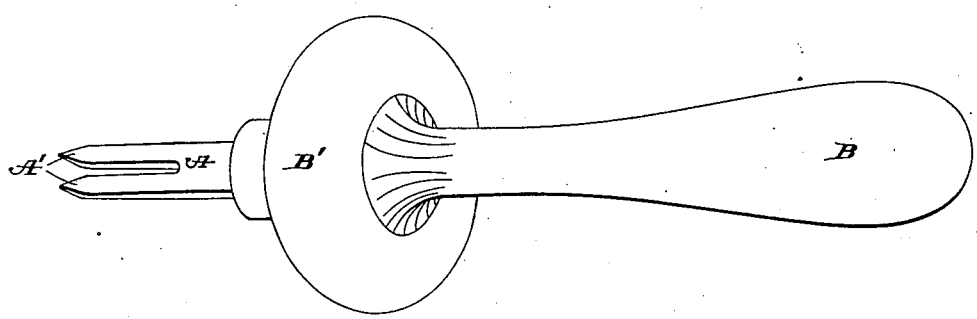
WITNESSES
Chas. L. Hyde.
Mattie McGinnis
INVENTOR
Harry Havill
BY HIS ATTORNEYS
Hazard & Harpham ary 20, 1902.

UNITED STATES PATENT OFFICE.

HARRY HAVILL, OF LOS ANGELES, CALIFORNIA.

WEEDING IMPLEMENT.

SPECIFICATION forming part of Letters Patent No. 700,685, dated May 20, 1902.

Application filed August 14, 1901. Serial No. 72,065. (No model.)

*To all whom it may concern:*

Be it known that I, HARRY HAVILL, a citizen of the United States, residing at Los Angeles, in the county of Los Angeles, State of California, have invented new and useful Improvements in Weeding Implements, of which the following is a specification.

My invention relates to an implement for hand use to aid in pulling weeds or plants from a lawn or from the ground; and the object thereof is to provide an implement of simple construction and considerable power, so that weeds which have long roots may be easily extracted from the lawn or ground therewith by the use of a small amount of force. I accomplish this object by the weeding implement described herein and illustrated in the accompanying drawing, which is a perspective view of my weeding-tool.

In the drawing, A is a forked blade, the tines A' of which are pointed, which is securely fastened in the handle B. This handle is provided with an enlarged globular-shaped front end B', in which the blade is securely fastened, which front is used as a fulcrum to pry a weed having a strong root out of the ground. The rear portion of the handle is of a suitable shape to be grasped with the hand.

In the use of my implement the blade is pushed into the ground with the tines astride the root of the weed to be removed therefrom, when by bearing down on the rear end of the handle the globular front portion comes in contact with the surface of the ground and operates as a fulcrum, by means of which the weed can easily be pried out of the ground. With some weeds it is not necessary to push the blade into the ground; but it may be placed astride the stalk or stem thereof near the ground and the implement twisted to roll the top upon the tines of the blade, the globular-shaped front end rolling on the ground and rendering such use of the tool very easy. The globular front end prevents the hand from slipping down upon the blade and also from coming in contact with the ground until after the weed is started. I prefer that the globular portion should be slightly flattened, both in front and the rear, as it is lighter. I also prefer to make the blade of tempered steel and the handle of wood; but any suitable material may be used. The whole implement could be made of malleable cast-iron, the handle being properly cored out to make the tool light enough. Other shapes might be given to the front end of the handle without departing from the spirit of my invention, which consists of a weeding-tool having a blade provided with a handle, the front end of which is enlarged to form a fulcrum between the rear end of the handle and the blade at all points, the blade being mounted centrally in the handle and having the center line thereof coincident with the center line of the handle.

Having described my invention, what I claim as new, and desire to secure by Letters Patent, is—

1. A weeding implement comprising a forked blade centrally and rigidly mounted in the front end of a handle and having its longitudinal center line coincident with the longitudinal center line of the handle, and a handle having a globular enlargement on the front end thereof extending equally in all directions in a line at right angles from the longitudinal center line of the handle, said enlarged end forming a fulcrum whereby a weed in the blade may be pried out of the ground.

2. In a weeding implement, a handle therefor having a globular enlarged front end, said enlargement extending equally around the longitudinal central line of the handle and a portion extending rearwardly from said enlarged portion, adapted to be grasped by the hand, in combination with a blade therefor centrally and rigidly mounted in the front end of the handle with its longitudinal center line coincident with the longitudinal center line of the handle.

In witness that I claim the foregoing I have hereunto subscribed my name this 6th day of August, 1901.

HARRY HAVILL.

Witnesses:
G. E. HARPHAM,
MATTIE MCGINNIS.